United States Patent
Merz

[11] 3,814,218
[45] June 4, 1974

[54] MECHANICAL OVERRUNNING BRAKING SYSTEM FOR TRAILERS OR THE LIKE

[76] Inventor: Herbert Merz, Pirolweg 1, 3 Hannover-Buchholz, Germany

[22] Filed: May 8, 1972

[21] Appl. No.: 251,092

[30] Foreign Application Priority Data
May 11, 1971 Germany............................ 2123373

[52] U.S. Cl. .............................. 188/112, 188/106 R
[51] Int. Cl. ............................................... B60t 7/20
[58] Field of Search............. 188/2 R, 106 R, 106 P, 188/112, 141

[56] References Cited
UNITED STATES PATENTS
| | | | |
|---|---|---|---|
| 2,973,062 | 2/1961 | Tucker.................................. | 188/112 |
| 3,460,654 | 8/1969 | White et al. ......................... | 188/112 X |
| 3,666,060 | 5/1972 | Schroter ............................... | 188/112 |

*Primary Examiner*—Duane A. Reger
*Attorney, Agent, or Firm*—Michael S. Striker

[57] ABSTRACT

A mechanical overrunning braking system for trailers has main and auxiliary braking units which are mounted on the towed vehicle, at least two wheel brakes on the trailer, and cables or rods connecting the spreading levers or toggle leverages of the wheel brakes with the two units. Each wheel brake has two brake shoes one of which acts as a primary shoe in response to operation of one of the braking units while the brake drum rotates forwardly and the other of which acts as a primary shoe in response to operation of one of the braking units while the drum rotates rearwardly. A package of prestressed dished springs can be deformed only in response to operation of the auxiliary braking unit to thereby force the other shoe into frictional engagement with the drum. The characteristic curve of the springs is degressive or regressive, at least in the region corresponding to stressing of such springs beyond the initial stress. A force limiting device is installed between the main braking unit and the cables or rods to prevent the main braking unit from furnishing to the cables or drums a force which is sufficient to effect a deformation of springs to the extent which is necessary to move the other shoe into engagement with the brake drum.

18 Claims, 12 Drawing Figures

MECHANICAL OVERRUNNING BRAKING SYSTEM FOR TRAILERS OR THE LIKE

BACKGROUND OF THE INVENTION

The present invention relates to improvements in overrunning braking systems for trailers or analogous towed vehicles. More particularly, the invention relates to improvements in mechanical overrunning braking systems for such vehicles.

An overrunning braking system for trailers normally comprises a primary or main braking portion or unit, an auxiliary braking portion or unit, at least one device which serves to limit the braking force, and at least two wheel brakes. Each wheel brake normally employs two brake shoes in dual servo arrangement.

Certain presently known overrunning braking systems must be provided with two discrete braking force transmitting devices one of which connects the actuating members of wheel brakes with the main braking unit and the other of which connects the actuating members of wheel brakes with the auxiliary braking unit. Furthermore, such conventional braking systems employ pairs of independent tensioning or actuating members for each wheel brake. One actuating member of each pair is associated with the main braking unit and acts upon the brake shoes which are applied primarily for braking during movement of the towed vehicle in a forward direction. The other actuating member of each pair is associated with the auxiliary braking unit and acts on both brake shoes of each wheel brake during braking of the movement in both directions.

The just described overrunning braking systems exhibit the important advantage that the braking action during rearward movement of a towed vehicle is only a small fraction (normally between 10 and 15 percent) of the braking action during movement of the towed vehicle in a forward direction. Consequently, a trailer which is coupled to a truck or another towing vehicle can be moved rearwardly without necessitating prir disengagement of a so-called antireversing device.

However, the just described overrunning braking systems exhibit the serious drawback that the initial and maintenance cost of such braking systems is very high.

SUMMARY OF THE INVENTION

An object of the invention is to provide an overrunning braking system wherein the main or primary braking unit and the auxiliary braking unit on the towed vehicle are operatively connected with the wheel brakes by common braking force transmitting means.

Anothe object of the invention is to provide an overrunning braking system which need not employ an antireversing device for the towed vehicle.

A further object of the invention is to provide novel and improved wheel brakes for use in a mechanical overrunning braking system.

An additional object of the invention is to provide a wheel brake which employs a single actuating or tensioning element for brake shoes or analogous elements serving to engage a rotary drum or disk in response to operation of the main or auxiliary braking unit.

The invention resides in the provision of a mechanical overrunning braking system for a towed vehicle which is coupled to a towing vehicle. The braking system comprises main or primary and auxiliary braking portions or units, at least one wheel brake (but preferably) at least two wheel brakes)mounted on the towed vehicle and comprising a driven component (e.g., a brake drum) which is rotatable in forward and rearward directions in response to forward or rearward movement of the towing vehicle and a plurality of braking components (e.g., a pair of brake shows in so-called dual servo arrangement) movable into and from frictional engagement with the driven component, and common braking force transmitting means (such as cables or rods) provided between the two units on the towed vehicle and the wheel brake to effect a movement of at least one braking component into frictional engagement with the driven component in response to operation of either braking unit.

The braking components include first and second braking components which respectively act as primary components in response to operation of one of the braking units while the driven component respectively rotates in forward and rearward directions. The wheel brake further comprises actuating means (e.g., a pivotable spreading lever or a toggle leverage) which receives motion from the force transmitting means and is arranged to urge the first component into engagement with the driven component in response to operation of either braking unit. Still further, the wheel brake comprises preferably deformable displacing means (such as one or more packages of prestressed dished springs) which is interposed between the actuating means and the second braking component to effect an engagement between the second component and the driven component only in response to operation of the auxiliry braking unit. In other words, the braking force which is furnished to the actuating means in response to operation of the main braking unit does not suffice to deform or otherwise influence the displacing means for the purpose of effecting an engagement between the second braking component and the driven component.

An overrunning dev ce (such as a dashpot or a slotted link) is preferably interposed between the force transmitting means and the auxiliary braking unit to allow for operation of the main braking unit while the auxiliary braking unit remains inoperative.

The novel features which are considered as characteristic of the invention are set forth in particular in the appended claims. The improved braking system itself, however, both as to its construction and its mode of operation, together with additional features and advantages thereof, will be best understood upon persual of the following detailed description of certain specific embodiments with reference to the accompanying drawing.

DESCRIPTION OF THE PREFERRED EMBODIMENTS

Figure 1:
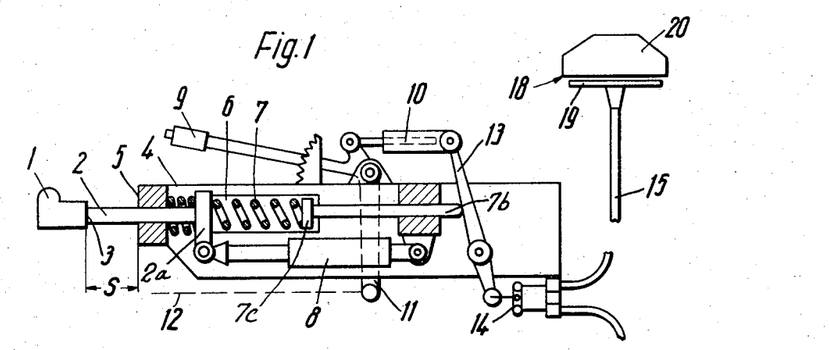
FIG. 1 is a fragmentary diagrammatic partly elevational and partly sectional view of a braking system including two wheel brakes which embodies one form of the invention.

Referring first to FIG. 1, there is shown a mechanical overrunning braking system which includes two wheel brakes 18 on the towed vehicle or trailer (not shown) and two braking units or portions mounted on the towed vehicle (not shown). The two braking units or portions include a main or primary braking unit 4 which receives motion from the inertia force of the trailer arising when the brakes of the towing vehicle are applied and an auxiliary braking unit which includes a brake hand lever 9. The two braking units are operatively connected with the wheel brakes 18 by braking force transmitting cables 15.

The foremost part of an input element or push rod 2 in the main braking unit 4 is provided with a spherical coupling element 1 which is operatively connected to the hitch of the towing vehicle (not shown) and can shift the push rod 2 in a direction to the right, as viewed in FIG. 1, against the opposition of a vibration damping device 8 where shown as a hydraulic shock absorber having a rear portion articulately connected to the drawing device of the towed vehicle and a telescoped front portion articulately connected to a traverse or crosshead of the push rod 2.

When the towing vehicle is decelerated a thrust arises between towing vehicle and trailer, and the coupling element 1 moves the rod 2 to thereby pivot a power amplifying lever 13 which is mounted to the drawing device of the towed vehicle and can displace a balance beam 14 connected with the front ends of the cables 15. The manner in which such clockwise pivoting of the power amplifying lever 13 results in actuation of the wheel brakes 18 will be described in connection with FIGS. 4 and 5.

A braking force limiting device 6 is interposed in the power train between the rod 2 and the power amplifying lever 13. In the embodiment of FIG. 1, the force limiting device 6 includes a prestressed helical spring 7 which reacts against the crosshead 2a and bears against a retainer 7c at the front end of a push rod 7b abutting against the longer arm of the lever 13. The initial stressing of the spring 7 is preferably selected in such way that the wheel brakes 18 can furnish a required force for the braking of the towed vehicle without exceeding the initial stressing of the spring 7. If the rod 2 is subjected to greater longitudinally acting stresses than warranted by a prescribed or contemplated higher delay in stoppage of the towed vehicle, the spring 7 is compressed so that a shoulder 3 of the rod 2 covers the entire distance s and comes into abutment with a stationary stop 5 of the main braking unit 4. This insures that the force acting upon the lever 13 cannot exceed a predetermined maximum value. Such value can be selected or adjusted, for example, by providing for adjustment of the shoulder 3 lengthwise of the rod 2 and/or by making the stop 5 adjustable in longitudinal direction of the rod 2. It will be noted that the shoulder 3 and the stop 5 determine the maximum depression of the rod 2, the maximum clockwise pivotal movement of the lever 13, and hence the maximum braking force which can be applied by the wheel brakes 18 when the braking action is furnished by the main braking unit 4.

The braking action is not so limited when the wheel brakes 18 are actuated by the auxiliary braking unit including the brake hand lever 9 or in response to tearing of an emergency braking cable 12 which is broken in response to accidental separation of the towed vehicle from the towing vehicle. The lever 9 is coupled to the lever 13 by way of an overrunning cylinder 10 which allows for pivoting of the lever 13 by the rod 2 while the lever 9 remains at a standstill. The pivoting of lever 9 in a clockwise direction by the driver's hand causes the lever 13 to pivot clockwise and to thus actuate the wheel brakes 18 independently of the main braking unit. The cable 12 can pivot the lever 13 by way of a further lever 11 which is operatively connected with the lever 13 through the intermediary of the overrunning cylinder 10.

The vibration damping device 8 constitutes an optional feature of the braking system; it can be omitted if the standards set for the driving and braking properties of the towed vehicle are not too high.

Figure 2:
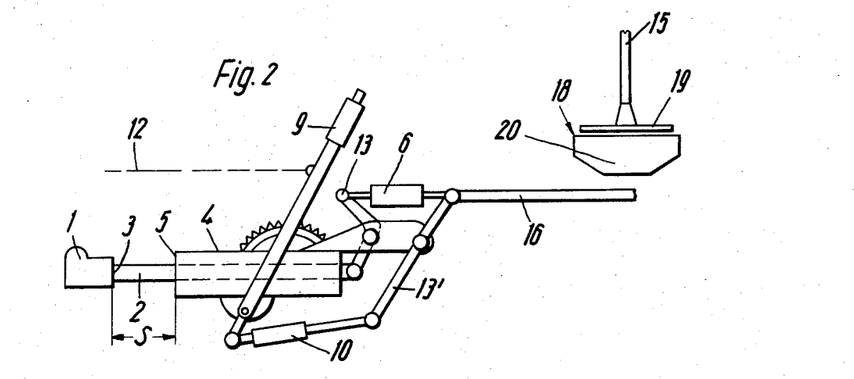
FIG. 2 is a similar view of a second braking system with a modified operative connection between the main and auxiliary braking units and the wheel brakes on the towed vehicle.

FIG. 2 illustrates a modified overrunning braking system which employs a first power amplifying lever 13 between the rod 2 and the braking force transmitting rod 16 (replacing the cables 15 of FIG. 1) and a second power amplifying lever 13' between the rod 16 and the brake hand lever 9. The rod 16 forms part of a linkage which connects the levers 13, 13' with the wheel brakes 18 (not shown in FIG. 2). The force limiting device 6 is installed between the lever 13 and the rod 16, and the overruning cylinder 10 is installed between the levers 9 and 13'. The cable 12 is connected directly to the lever 9. The actuation of wheel brakes 18 takes place in response to a pull upon the rod 16; therefore, the force limiting device 6 is also responsive to a pull rather than to a push as in FIG. 1. It will be seen that the force limiting device 6 does not influence the braking action which is initiated by counterclockwise pivoting of the lever 9, either by hand or by the cable 12. The lever 13' pivots in response to pivoting of the lever 13 but the lever 9 remains at a standstill due to provision of the overrunning cylinder 10.

Figure 3:
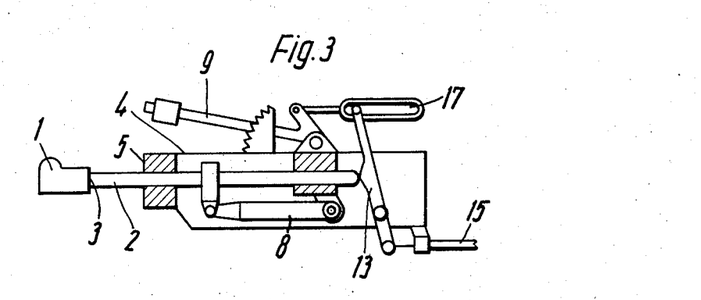
FIG. 3 is a fragmentary partly elevational and partly sectional view of those components of a simplified braking system which are mounted on the towed vehicle.

FIG. 3 illustrates a third braking system wherein the cylinder 10 of FIGS. 1 and 2 is replaced with an overrunning link having a slot 17 which allows the power amplifying lever 13 to pivot in response to actuation of the main braking unit 4 while the brake hand lever 9 remains at a standstill. Also, the braking system of FIG. 3 dispenses with the cable 12 and lever 11 of FIG. 1. FIG. 3 does not show the wheel brakes and the balance beam 14; the operative connection between the lever 13 and the wheel brakes is indicated diagrammatically by a portion of one of the cables 15. It is clear, however, that the transmission of braking forces from the lever 13 to the wheel brakes can be effected in any other suitable way, e.g., by means of a single cable 15 and a balance beam in or on the towed vehicle. The same holds true for the embodiments of FIGS. 1 and 2, i.e., the exact nature of connections between the two braking units on the towing vehicle and the wheel brakes on the towed vehicle forms no part of the invention.

It will be noted that the braking system of FIG. 3 further dispenses with the braking force limiting means 6 of FIG. 1 or 2. Therefore, the braking system of FIG. 3 will be used mainly in connection with wheel brakes of the type wherein the prestressed springs are constructed, dimensioned and mounted in such a way that they can also perform the function of the force limiting means 6. An example of such braking system will be described in connection with FIG. 6.

Figure 4:
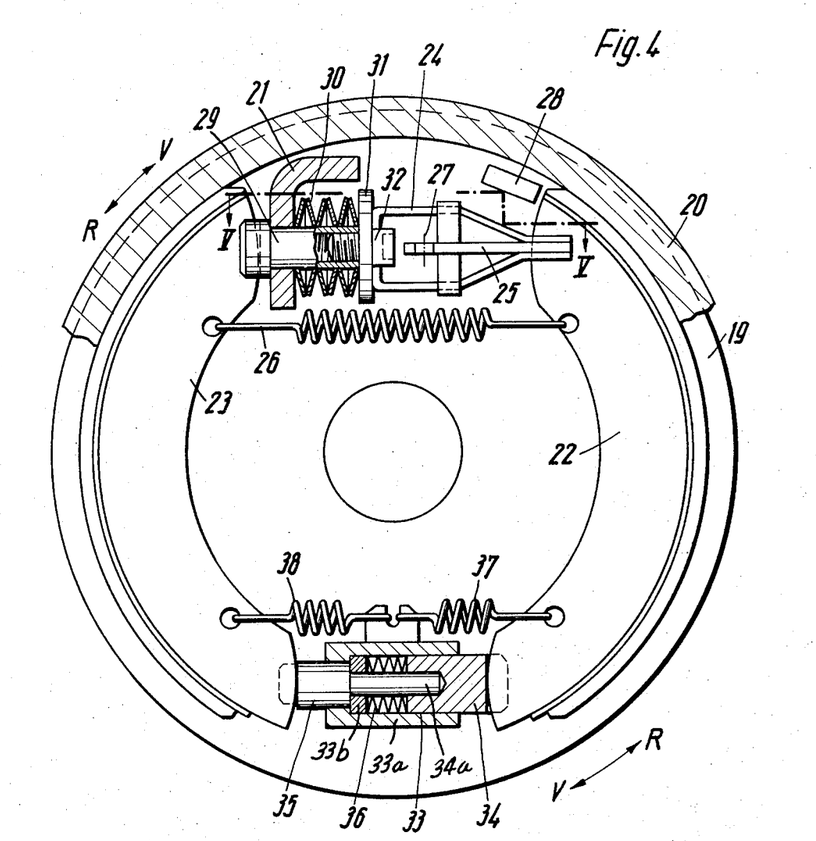
FIG. 4 is a partly front elevational and partly sectional view of one of the wheel brakes in the braking system of FIG. 1 or 2.
Figure 5:
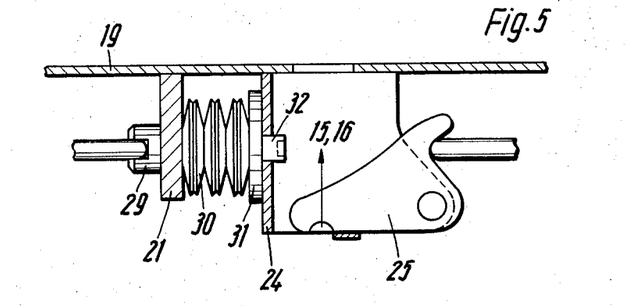
FIG. 5 is a fragmentary sectional view as seen in the direction of arrows from the line V-V of FIG. 4.

One of the wheel brakes 18 is illustrated in FIGS. 4 and 5. This wheel brake includes a rotary driven component here shown as a brake drum 20 and a carrier 19 for two braking components in the form of brake shoes 22, 23 which are installed in what is known as dual servo arrangement. The lower end portions of the brake shoes 22, 23 (as viewed in FIG. 4) abut against a slide member 33 which, during braking while the drum 20 rotates in a forward direction (arrow V) effects a power flow from the shoe 22 to the shoe 23. During braking while the drum 20 rotates in a rearward direction (arrow R), the slide member 33 causes a flow of power from the shoe 23 toward the shoe 22. The exact construction of the slide member 33 forms no part of the invention. FIG. 4 shows that the member 33 includes power reducing means 36 which is active only during power flow from the shoe 22 toward the shoe 23 (arrow V). The carrier 19 supports two retracting springs or return springs 37, 38 which are respectively connected to the shoes 22, 23 and tend to maintain such shoes out of engagement with the drum 20. The bias of the spring 37 upon the shoe 22 exceeds the bias of the spring 38 upon the shoe 23. This insures that each of the shoes 22, 23 assumes a predetermined retracted position when the wheel brake 18 is not actuated. When the drum 20 rotates in the direction indicated by the arrow V and the shoe 22 is caused to engage the rotating drum, a plunger 34 of the slide member 33 urges the shoe 23 against the drum 20 through the intermediary of a second plunger 35 and against the opposition of a helical or dished spring 36 which constitutes the power reducing means. The spring 36 reacts against a partition 33b which is abuted to the carrier 19 and extends into the casing 33a of the slide member 33. This spring tends to move the plunger 34 in a direction to the right, as viewed in FIG. 4. The plunger 34 can move the plunger 35 by way of a shaft 34a. When the wheel brake 18 of FIGS. 4 and 5 is actuated while the drum 20 rotates in the direction indicated by the arrow R, the spring 36 merely acts as an elastic cushion. Thus, the spring 36 reacts indirectly against the carrier 19 when the shoe 22 bears against the plunger 34 while the drum 20 rotates in the direction indicated by the arrow V so that the force which the shoe 22 tends to transmit to the shoe 23 is reduced by the resistance of the spring 36. However, when the shoe 23 bears against the plunger 35 while the drum 20 rotates in the direction indicated by the arrow R, the entire force is transmitted to the shoe 22 by way of shaft 34a and plunger 34. The spring 36 insures a vibration-free braking action and uniform wear upon the brake shoes 22, 23 when the wheel brake 18 is actuated while the drum 20 rotates forwardly (arrow V) which evidently is the customary or most frequently occurring type of braking action. On the other hand, the just described mode of operation of the slide member 33 insures a very high braking action characteristic which is desirable insofar as it insures that relatively small actuating forces furnished by the auxiliary braking unit suffice to produce a satisfactory braking action during rotation of the drum 20 in the direction indicated by the arrow R.

When the shoes 22, 23 are applied while the drum 20 rotates in the direction of arrow V, the shoe 22 acts as a primary shoe. This shoe is moved against the adjacent portion of the rotating drum 20 by way of the respective cable 15 or rod 16 which is coupled to an actuating or spreading lever 25, as at 27. The lower end portion of the shoe 22 (i.e., that end portion which is remote from the actuating lever 25) bears against the plunger 34 of the slide member 33 and causes the plunger 35 to move the shoe 23 (which then acts as a secondary shoe) against the adjacent portion of the drum 20. That end portion of the shoe 23 which is remote from the slide member 33 bears against a bracket 21 which is secured to the carrier 19. A stop bolt 29 is interposed between the upper end portion of the shoe 23 and the bracket 21.

The actuating lever 25 is pivotably mounted in a substantially U-shaped holder 24 which is loosely and reciprocably mounted on the carrier 19 and is also loosely mounted on the head of a tightening screw 32. If desired, the holder 24 can be assembly with the screw 32 and a spring retainer 31 to form therewith a rigid unit. In the illustrated embodiment, the externally threaded stem of the tightening screw 32 meshes with the aforementioned stop bolt 29 for the shoe 23. In this way, the retainer 31 (which abuts against the head of the tightening screw 32) stresses a displacing device here shown as a package of dished springs 30 which are mounted on the shank of the stop bolt 29 between the retainer 31 and the bracket 21. By rotating the screw 32, one can change the initial stressing of the springs 30. The initial stressing and the characteristic curve of the springs 30 should be selected in such a way that the maximum force furnished to the lever 25 by way of the cable 15 or rod 16 in response to operation of the primary braking unit 4 on the towed vehicle (and determined by the force limiting device 6 of FIG. 1 or 2) does not result in such leftward movement of the stop bolt 29 as is necessary to move the shoe 23 against the drum 20. In other words, and since the stop bolt 29 of FIG. 4 serves as a means for moving the brake shoe 23 against the drum 20 when the wheel brake is actuated by the auxiliary braking unit while the drum 20 rotates in the direction indicated by arrow R, the initial stressing of the springs 30 should be such that, during operation of the primary braking unit 4 (while the drum 20 rotates in the direction indicated by the arrow V), the maximum leftward displacement of the bolt 29 against the opposition of the springs 30 should not suffice to engage the shoe 23 with the internal surface of the drum 20. This insures that the shoe 23 cannot act as a primary shoe during braking while the drum 20 rotates in the direction indicated by the arrow R, namely, when the main braking unit 4 of FIG. 1 or 2 causes the actuating lever 25 to move the primary shoe 22 against the drum 20. During such braking while the towed vehicle moves in reverse, the reaction force which develops when the lever 25 urges the shoe 22 against the drum 20 is taken up by the carrier 19 by way of the holder 24, retainer 31, package of dished springs 30 and bracket 21. Consequently, during braking by the main unit 4 when the drum 20 rotates in the direction indicated by the arrow R, the braking action is furnished almost exclusively by the shoe 22 and this only with a running-down action, i.e., with a very small braking force. The braking action is so slight that the towed vehicle can be driven rearwardly when the rod 2 of FIG. 1 is depressed all the way so that the distance s is reduced to zero because the shoulder 3 abuts against the stop portion 5. Depending on the construction of the wheel brake 18, the braking action during rotation of the drum 20 in direction indicated by the arrow R is only between 5 and 15 percent of braking action when the drum 20 rotates in the direction indicated by the arrow V.

Since the force limiting device 6 of FIG. 1 or 2 is operative only when the main braking unit 4 is operated (but not in response to actuation of the auxiliary braking unit-lever 9) the actuation of auxiliary braking unit (while the drum 20 rotates in the direction indicated by the arrow R) can result in such additional stressing of dished springs 30 shown in FIGS. 4 and 5 that the stop bolt 29 causes the shoe 23 to move into actual engagement with the drum 20. Thus, the shoe 23 becomes the primary shoe and the shoe 22 acts as a secondary shoe. The upper end portion of the shoe 22 then engages a fixed abutment 28 provided on the carrier 19 adjacent to the holder 24. The abutment 28 can be omitted if the lever 25 and the holder 24 are dimensioned in such a way that they can take up the bearing pressure of the shoe 22. The bearing pressure furnished by the shoe 22 (which acts as a secondary shoe) is then taken up by the carrier 19 by way of the lever 25, holder 24, retainer 31, springs 30 and bracket 21.

The wheel brake of FIGS. 4 and 5 can be provided with one or more manually or automatically operated adjusting devices (not shown). For example, this wheel brake can be provided with adjusting means at, on or in the stop bolt 29, retainer 31 and/or slide member 33, especially if the member 33 is a simple or composite member without any power reducing means.

The upper end portions of the shoes 22, 23 are coupled to each other by a helical retracting spring 26 which cooperates with the springs 37, 38 to normally maintain the shoes out of contact with the lining at the internal surface of the drum 20.

Figure 6:
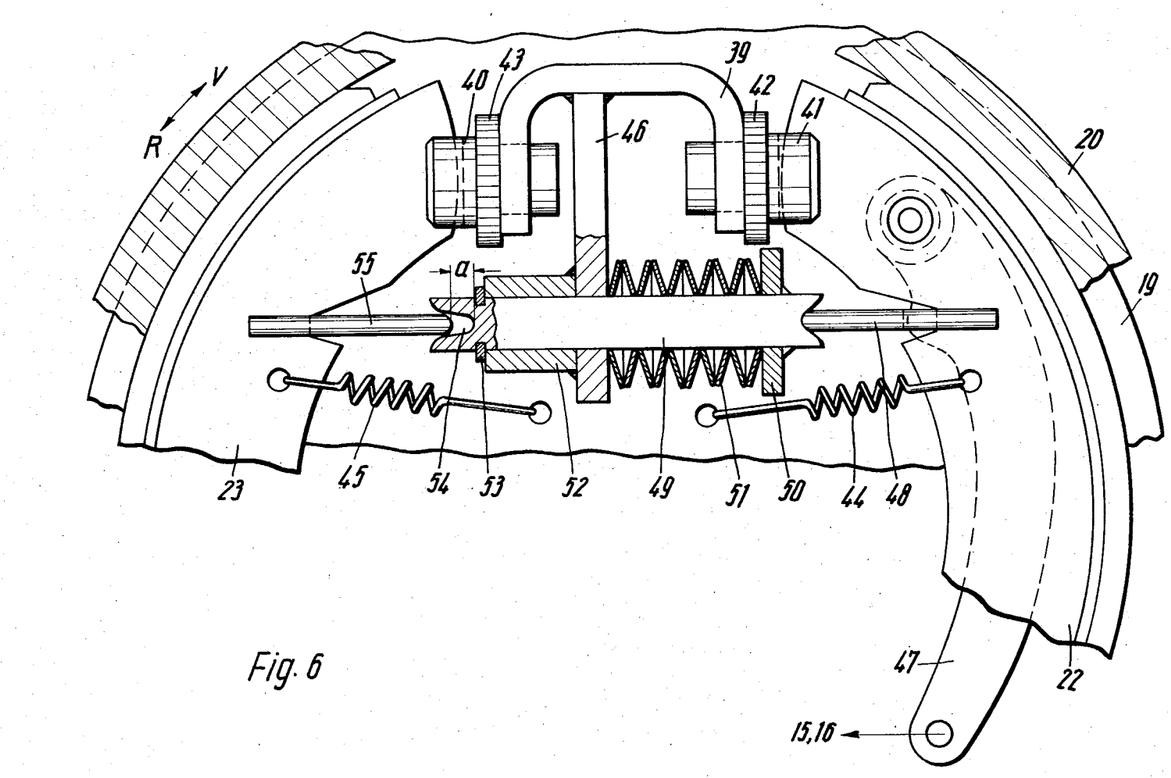
FIG. 6 is a fragmentary partly front elevational and partly sectional view of one of several wheel brakes which can be utilized with advantage in the braking system of FIG. 3.

In the embodiment of the wheel brake which is shown in FIG. 6, the carrier 19 is rigidly connected with a substantially U-shaped bracket 39 having two parallel arms which respectively support stop bolts 40, 41 for the upper end portions of braking components or brake shoes 23 and 22. The function of the stop bolt 40 is somewhat similar to that of the stop bolt 29 shown in FIGS. 4 and 5 when the main braking unit 4 of FIG. 1 or 2 is operated while the driven component or drum 20 rotates in the direction indicated by the arrow V or R. When the driver operates the auxiliary braking unit including the lever 9, the stop bolt 40 of FIG. 6 transmits a braking couple only while the drum 20 rotates in the forward direction (arrow V). The stop bolt 41 transmits a braking couple substantially in the same way as the fixedly mounted abutment 28 of FIG. 4, i.e., only when the auxiliary braking unit is operated while the drum 20 rotates in a rearward direction (arrow R).

The function of the actuating lever 25 of FIG. 4 is performed by a toggle leverage 37 which is pivotably connected with the shoe 22 and is analogous to similarly mounted leverages used in mechanical actuating means for hydraulic wheel brakes. The lower end portion of the toggle leverage 47, as viewed in FIG. 6, is coupled to the corresponding braking force transmitting cable 15 or rod 16. When the cable 15 or the rod 16 exerts a pull in the direction indicated by the arrow, the leverage 47 bears against a pressure transmitting member 48 and causes the upper end portion of the shoe 22 to bear against the drum 20. The pressure transmitting member 48 bears against a reciprocable slide 49 which is rigidly connected with a spring retainer 50 and is reciprocable in a sleeve 52 welded or otherwise secured to a supporting plate 46 which is rigid with the carrier 19. In order to enhance the stability of the carrier 19, the plate 46 for the sleeve 52 can be welded or otherwise rigidly secured to the U-shaped bracket 39. The slide 49 extends through the central openings of a deformable displacing means here shown as a package of dished springs 51 which are maintained in prestressed condition by a split ring 53 inserted into a circumferential groove of the slide 49 to the left of the guide sleeve 52. If desired, the slide 49 can be provided with several grooves and the initial stressing of springs 51 can be changed by removing the split ring 53 from a first groove and inserting it into another groove. The springs 51 react against the plate 46 (i.e., against the carrier 19) and bear against the retainer 50 which is rigid with the slide 49. In this way, the springs 51 normally maintain the pressure transmitting member 48 in engagement with the slide 49 as well as with the shoe 22. The member 48 can be made rigid with the part 22 or 49. If desired, the sleeve 52 can be rotated to the right of the plate 46 so that the springs 51 then react against the right-hand end face of the sleeve 52.

That end face of the slide 49 which faces away from the shoe 22 is provided with a slot 54 which receives a portion of a second pressure transmitting member 55 serving to urge the shoe 23 against the drum 20 in response to actuation of the auxiliary braking unit shown in FIG. 1 or 2. The member 55 is normally received in the slot 54 with a certain amount of clearance (shown in a). The purpose of the clearance a is to insure that the package of prestressed dished springs 51 must undergo additional compression or shortening before the shoe 23 can be forced against the drum 20 in response to such leftward movement of the slide 49 that the clearance a is reduced to zero and the slide 49 begins to shift the member 55 in response to clockwise pivoting of the toggle leverage 47.

If the clearance $a$ is reduced to zero while the wheel brake of FIG. 6 is idle, the operation of this wheel brake is practically identical with that of the wheel brake 18 shown in FIGS. 4 and 5. The only difference (when the clearance $a$ does not exist in idle condition of the wheel brake) is that the bearing pressures are taken up by elements other than those which apply force to the brake shoes.

Combined with appropriate selection of the characteristic curve and initial stressing of the springs 51, the provision of clearance $a$ brings about several important advantages. Thus, the initial stressing of springs 51 can be reduced below that value which corresponds to the maximum permissible force acting on the shoe 23 and which is determined by the adjustment of the braking force limiting device 6. Consequently, the springs 51 can perform the additional function of acting as an elastic cushion for the force transmitting member 48 to thus reduce or eliminate undesirable peaks which develop in response to the application of higher braking couples. This contributes to vibration-free operation of the brake system.

The clearance $a$ further allows for such selection of the initial stress upon the springs 51 that, when the braking system is in satisfactory condition, the prescribed or desired deceleration of the towed vehicle is either achieved or at least closely approximated. The width of the clearance $a$ is selected in such a way that, even if the adjustment of the braking system is perfect, the clearance $a$ is not reduced to zero prior to complete elimination of clearance $s$ shown in FIG. 1, i.e., at least a portion of the clearance $a$ remains when the shoulder 3 of the rod 2 already abuts against the stop portion 5 of the main braking unit 4. In such event, the force limiting device 6 of FIG. 1 or 2 can be omitted and the construction of the braking system simplified in a manner as described in connection with FIG. 3. A prerequisite for proper operation of the auxiliary braking unit, also when the drum 20 rotates in the direction indicated by the arrow R, is that the surplus or reserve distance which the auxiliary braking unit (see the slot 17 in FIG. 3) can cover is large enough to reduce the width of the clearance $a$ to zero when the auxiliary braking unit (lever 9) is operated to move the shoe 23 against the drum 20 by way of the member 55 shown in FIG. 6.

By suitable construction and configuration of brake shoes 22, 23, toggle leverage (actuating means) 47 and slide 49 of FIG. 6, the members 48 and 55 can be dispensed with. A portion of the shoe 23 then extends directly into the slot 54 but the latter must then be located in a plane which is parallel to the plane of FIG. 6. Analogously, the member 55 can be omitted if the web or a projection of the shoe 22 extends directly into the recess 54a of the slide 49.

The adjusting means for the wheel brake of FIG. 6 includes a first screw 42 for changing the axial position of the stop member 41 relative to the right-hand arm of the bracket 39, and a second screw 43 which can be rotated to change the axial position of the stop member 40 relative to the left-hand arm of the bracket 39. The adjusting screw 42 for the stop member 41 can be omitted if the force transmitting connection between the main and auxiliary braking units on the one hand and the toggle leverage 47 on the other hand is provided with a turnbuckle or the like to compensate for the wear on the convex surface of the shoe 22.

An advantage of displacing means in the form of dished springs 30 or 51 is that they constitute the simplest practical embodiment of a spring structure with a degressive characteristic curve. This insures that, when the threshold value of the force which is necessary to cause the bolt 29 or member 55 to engage the shoe 23 is exceeded, such increase in the force furnished by auxiliary braking units results in a slight increase of the braking force. The force which must effect a compression of springs 30 or 51 to the extent which is necessary to move the shoe 23 into engagement with the drum 20 by way of the stop bolt 29 or pressure transmitting member 55 must be furnished by the auxiliary braking units, i.e., by the lever 9 of FIG. 1, 2 or 3, in addition to the force which must be applied to the shoe 23 while the drum 20 rotates rearwardly (arrow R). The smaller the increase in force and the more pronounced the degressivity or regressivity of the springs 30 or 51, the weaker will be the force which must be applied to the lever 9 in order to produce a satisfactory auxiliary or emergency braking action. The magnitude of the forces which are to be applied by way of the lever 9 increases with increasing weight of the towed vehicle.

Figure 7:
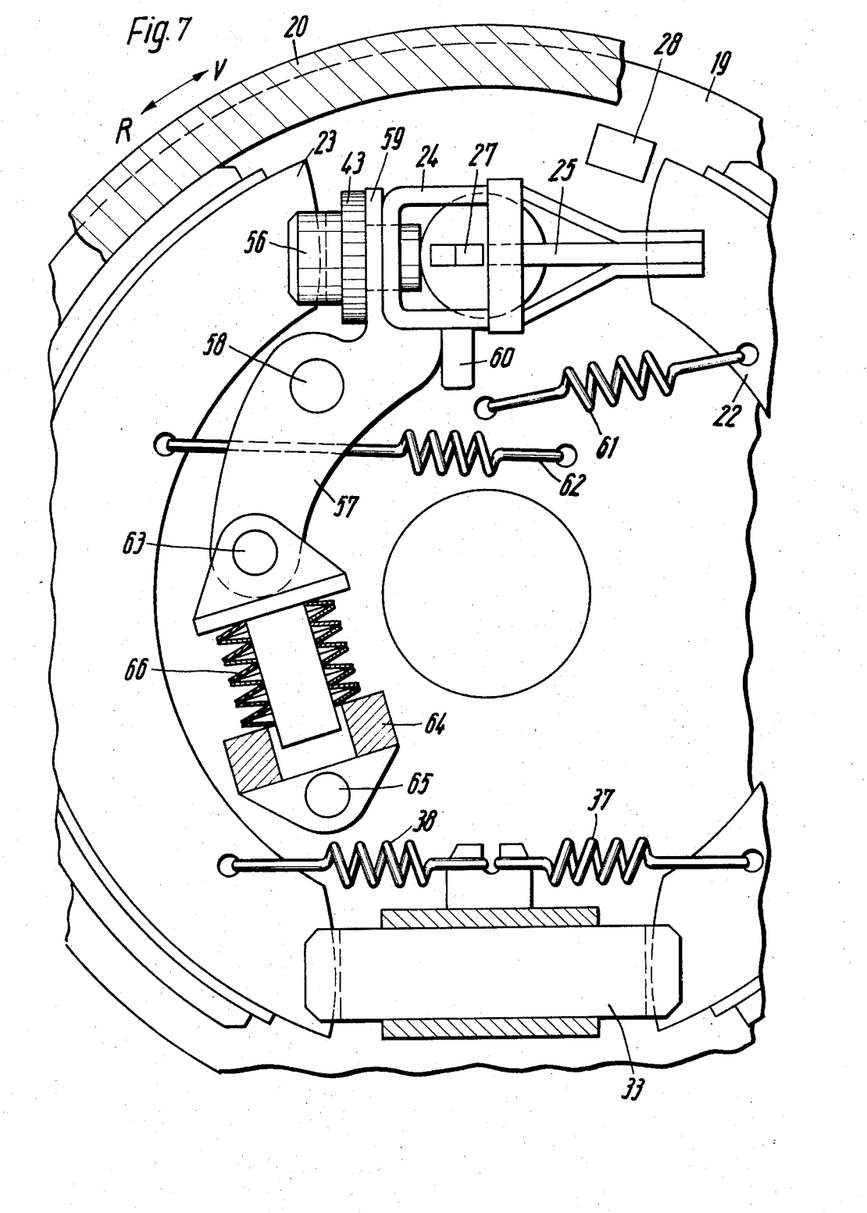
FIG. 7 is a fragmentary partly front elevational and partly sectional view of a wheel brake which constitutes a modification of the wheel brakes shown in FIGS. 4–5 and 6.

A wheel brake which embodies means for insuring that, due to specific configuration of certain prestressed resilient components, the auxiliary braking unit can bring about a highly satisfactory braking action with the exertion of an extremely small force is shown in FIG. 7. This wheel brake constitutes a modification of the wheel brake 18 shown in FIGS. 4–5. The slide member 33 of FIG. 4 is replaced with a one-piece slide member 133. If desired, the slide member 133 can be made in two pieces one of which is movable toward or away from the other to thus constitute a means for facilitating an adjustment of the braking action. A two-piece or adjustable slide member can be used in addition to or as a substitute for the adjusting screw 43 for the stop bolt 56 which can be engaged by the upper end portion of the brake shoe 23.

The carrier 19 of the wheel brake shown in FIG. 7 fixedly supports a pivot pin 58 for a two-armed displacing lever 57. The upper arm of the lever 57 has a plate-like extension 59 which supports the stop bolt 56 and the adjusting screw 43. Furthermore, the extension 59 serves as a back support for the holder 24 which pivotably supports the actuating lever 25 in the same way as described in connection with FIGS. 4 and 5. If desired, the holder 24 can be made integral with the extension 59 of the displacing lever 57.

The lower arm of the lever 57 is articulately connected with the male portion of a telescopic stressing device 64 for a package of dished springs 66 by means of a pivot pin 63. A further pivot pin 65 connects the female portion of the stressing device 64 with the carrier 19. The springs 66 are maintained in prestressed condition by a stop 60 which is adjacent to the upper arm of the lever 57 and determines the maximum extent of pivotal movement of the lever 57 in a clockwise direction, as viewed in FIG. 7. The stop 60 can also serve as a means for locating or supporting the holder 24 for the actuating lever 25. The bolt 56 will cause the upper end portion of the shoe 23 to bear against the drum 20 when the pressure furnished by the holder 24 against the extension 59 of the lever 57 exceeds the threshold value of the force which is required to effect further compression or shortening of the package of springs 66 between the male and female portions of the stressing device 64. The compression of springs 66 takes place in response to a counterclockwise pivotal movement of the lever 57 so that its upper arm moves away from the stop 60. By properly selecting the positions of pivot pins 58, 63, 65 relative to each other and relative to the stop bolt 56, and by properly selecting the characteristics of springs 66, the designer of the wheel brake shown in FIG. 7 can readily insure a regressive change in the force of springs 66 as a function of the extent of movement of the stop bolt 56 in a direction to the left, as viewed in FIG. 7. Thus, the force which must be applied to move the stop bolt 56 in a direction to the left at first increases to a predetermined peak value and thereupon begins to decrease while the bolt 56 continues to move toward the adjacent portion of the drum 20. In the absence of a clearance between the stop bolt 56 and the shoe 23 (see the clearance $a$ in FIG. 6) in deactivated condition of the wheel brake of FIG. 7, the maximum force which the lever 9 must furnish equals the threshold value of the force which is needed to start further compression or shortening of the package of springs 66. If a clearance is present, the wheel brake of FIG. 7 must be provided with an abutment for the upper end portion of the shoe 23 (e.g., with an abutment corresponding to the abutment 28 shown in FIGS. 4 and 7). This also holds true for the wheel brake 18 of FIG. 4. In the absence of a clearance, and when the wheel brake of FIG. 7 is actuated by the main braking unit while the drum 20 rotates forwardly or rearwardly (arrow V or R), and also when the wheel brake is actuated by the auxiliary braking unit while the drum 20 rotates forwardly (arrow V), the force which is transmitted by the upper end portion of the shoe 23 is taken up by the carrier 19 through the intermediary of the bolt 56, extension 59 of the lever 57 and stop 60. At least one of the pairs of retracting or return springs 37, 38 and 61, 62 can be replaced by a single return spring such as the spring 26 shown in FIG. 4. This also applies for the return springs 44, 45 of FIG. 6.

The displacing means of the wheel brake shown in FIG. 7 includes the lever 57, the springs 66, the stressing device 64 and the bolt 56.

Figure 8:
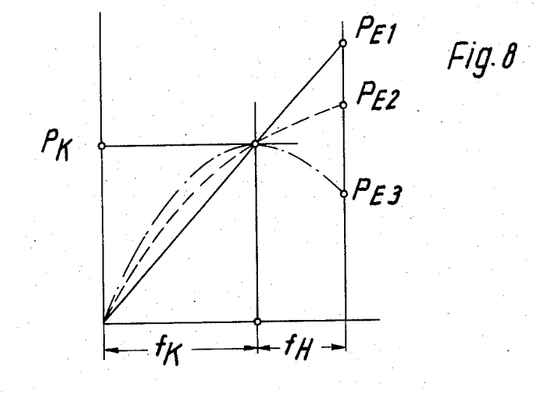
FIG. 8 is a diagram showing the characteristic curves of three different resilient displacing means which can be used in the wheel brakes of the improved braking system.

The diagram of FIG. 8 illustrates the relationship between the force which is required to stress the package of springs 30, 51 or 66 and the distance covered by the member 29, 49 or 56 when the clearance $a$ is zero both force and distance measured at the member 29, 49 or 56. The line PK denotes the threshold value of the force which is needed to effect further compression of springs 31, 51 or 66 and which should not be reached or exceeded in response to actuation of the main braking unit 4. The character $fK$ denotes the distance the springs have to be compressed in order to furnish the force PK. In the absence of a clearance $a$, the difference between the initial stressing of the springs 31, 51 or 66 and the stressing which results from application of the force PK corresponds only to the minute gap between the brake shoe 23 and the drum 20 in retracted position of this shoe. The width of such gap is only a small fraction of the distance $fK$ shown in FIG. 8. The straight line I which is indicated by a solid line represents the characteristic curve of a conventional spring. The maximum force furnished by such spring after contraction indicated by the distance $fH$ is shown at PE1. The broken line II represents the degressive character-istic curve of a package of dished springs (such as the springs 51) having predetermined dimensions. It will be noted that the maximum force which is required to reduce the length of such package by the distance $fH$ is PE2, i.e., substantially less than the force PE1. The phantom line III represents the regressive characteristic curve of a package 66 which is mounted in a manner as shown in FIG. 7. It will be noted that the maximum force PE3 is much less than PE2 and even less than the threshold value PK. In order to take advantage of such elasticity of the package 66 during actuation of the operating braking portion 4, the distance necessary to get the initial stressing of the package 66 must be smaller than $fK$ minus the clearance $a$.

Figure 9:
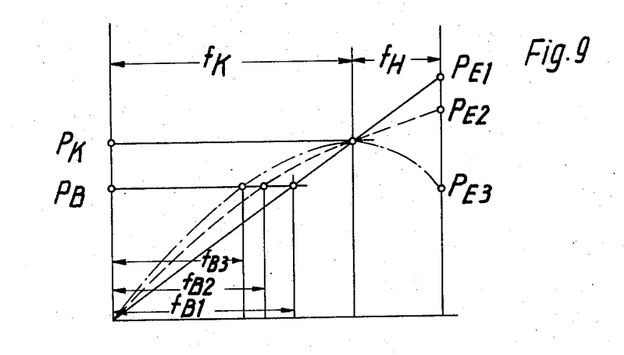
FIG. 9 is a similar diagram which shows the characteristic curves of resilient displacing means utilized in the wheel brakes of FIGS. 6 and 11.

FIG. 9 illustrates a second diagram which is characteristic of braking systems wherein the package of dished springs further performs the functions of the force limiting device 6 shown in FIGS. 1 and 2. The reference character PB denotes that force which must be reached in order to achieve a desired braking action. The required clearance $a$ equals the difference between the distances fk and the distance $fB1$, $fB2$ or $fB3$. An advantage of a braking system which exhibits the features illustrated in FIG. 9 is that the spring means exhibiting the degressive characteristic curve which is shown by broken lines and the spring means exhibiting the regressive characteristic curve indicated by phantom lines allows for a greater clearance $a$ whereby the force limiting effect of such spring means can be achieved in a more reliable and more secure way than with spring means having a straight characteristic curve. If the clearance $a$ is selected independently of the characteristic curve of the spring means, the degressive and regressive curves allow for a greater deceleration of the trailer than the straight curve without any actuation of the power limiting device.

Figure 10:
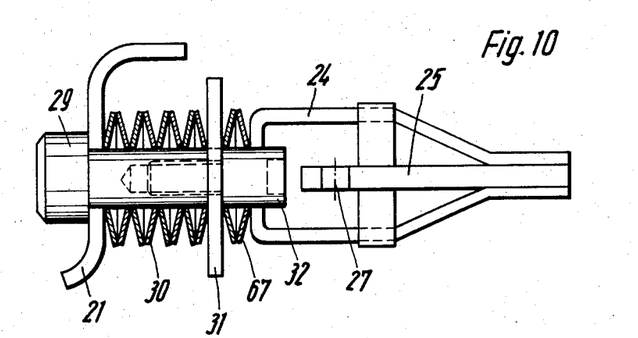
FIG. 10 is a fragmentary partly front elevational and partly sectional view of a further wheel brake which constitutes a modification of the wheel brake shown in FIGS. 4 – 5.

FIG. 10 illustrates a portion of a wheel brake which is similar to the wheel brake 18 of FIGS. 4 and 5. Two dished springs 67 are inserted without initial stressing between the spring retainer 31 and the holder 24. This insures a yieldable or gentle actuation even at low braking couples with advantages which were outlined in connection with FIG. 6 and are achieved at higher couples due to provision of the clearance $a$. The unstressed springs 67 produce a further beneficial action when the braking of the towed vehicle while the drum 20 rotates in the direction indicated by arrow V is immediately followed by a movement of the towed vehicle in a rearward direction. This is due to the fact that the force acting at the point 27 (connection of the cable 15 or rod 16 to the actuating lever 25) remains unchanged or even increases to the value determined by the setting of the braking force limiting device while the braking couple and the peripheral force at the drum 20 decrease to between 5 and 15 percent of the previously applied force in response to a change in the direction of rotation of the drum 20 from that indicated by arrow V to that indicated by the arrow R (see the description of FIGS. 4 and 5). Since the elastic deformation of the drum 20, shoes 22, 23 and brake linings (not shown) correspond to the produced peripheral force, the deformation decreases abruptly in response to a change in the direction of rotation from V to R. This could lead to undesirable jamming which could interfere with trouble-free transition from braked movement in a forward direction to practically unbraked movement in a rearward direction provided that all parts were rigidly mounted in the wheel brake. The movements due to elasticity of the shoes 22, 23, drum 20 and the linings are taken up by the additional dished springs 67. The braking system which employs wheel brakes of the type shown in FIG. 10 need not be provided with a discrete force limiting device 6. The function of this device is performed by the springs 67 which insure that the bolt 29 cannot move the brake shoe 23 (not shown in FIG. 10) when the push rod 2 of the main braking unit 4 is depressed all the way so that its shoulder 3 engages the stop portion 5.

Figure 11:
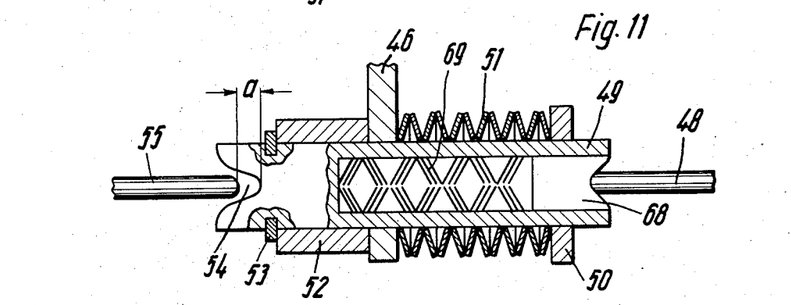
FIG. 11 illustrates a portion of a wheel brake which constitutes a modification of the wheel brake shown in FIG. 6.

FIG. 11 illustrates a portion of a further wheel brake which constitutes a modification of the wheel brake shown in FIG. 6 and exhibits the advantages of the structure shown in FIG. 10. The pressure transmitting member 48 does not act directly against the slide 49 but rather against the rightmost element of a package of dished springs 69 in an axial blind bore or recess of the slide 49. To this end, the left-hand end portion of the member 48 is enlarged to form a plunger 68 which is reciprocable in the slide 49. The package of dished springs 69 is installed in unstressed condition. If desired, these springs can be replaced by one or more helical springs or by other yieldable cushioning means.

Figure 12:
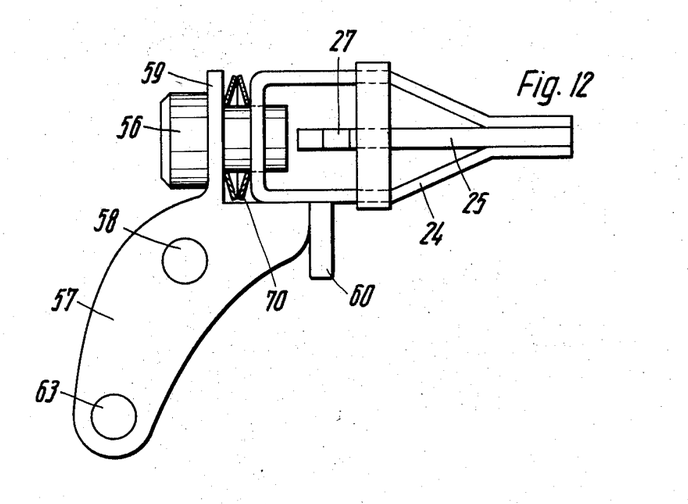
FIG. 12 illustrates a portion of a wheel brake constituting a modification of the wheel brake which is shown in FIG. 7.

FIG. 12 illustrates a further wheel brake which embodies the features of the wheel brake of FIG. 7 and exhibits the advantages of the structure shown in FIG. 10 or 11. The additional (unstressed) dished springs 70 are installed between the extension 59 of the lever 57 and holder 24 for the actuating lever 25. The operative connection between the lever 57 and the holder 24 is constructed and assembled in such a way that the holder 24 can pivot with the lever 57 but is also capable of moving in the axial direction of the bolt 56. The structure of FIG. 12 exhibits the same advantages as that shown in FIG. 10.

All of the dished springs (or analogous resilient means), including those which are installed in prestressed condition as well as those which are mounted in unstressed condition, can be made of suitable metallic or synthetic plastic material.

Each of the illustrated wheel brakes employs a pair of brake shoes for sliding application. However, it is equally within the purview of the invention to utilize any other type of wheel brakes in dual servo-arrangement, for example, wheel brakes which employ braking components in the form of pivotable brake shoes or so-called steering shoes. Also, the improved braking system can employ wheel brakes with more than two brake shoes as well as band brakes with dual servo arrangement of braking components in the form of brake bands. Moreover, the brake actuating means may employ wedges, cams or analogous actuating elements. The slide member 33 or 133 can be replaced with a pin connection between the shoes with or without a steering guide. All such modifications will be readily comprehended upon perusal of the preceding description of the illustrated embodiments.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. An overrunning braking system for a towed vehicle which is coupled to a towing vehicle, comprising main and auxiliary braking units mounted on the towed vehicle; at least one wheel brake mounted on the towed vehicle and comprising a driven component rotatable in forward and rearward directions and a plurality of braking components movable into and from frictional engagement with said driven component; common braking force transmitting means provided between said units and said brake to effect a movement of at least one braking component into engagement with said driven component in response to operation of either one of said units, said braking components including first and second components which respectively act as primary components in response to operation of one of said units while said driven component respectively rotates in forward and rearward directions, said wheel brake further including actuating means receiving motion from said force transmitting means and arranged to urge said first component into engagement with said driven component in response to operation of either one of said units, and displacing means interposed between said actuating means and said second component to effect an engagement between said second component and said driven component only in response to operation of said auxiliary braking unit; and an overrunning device interposed between said first transmitting means and said auxiliary braking unit to allow for operation of said main braking unit while said auxiliary braking unit remains inoperative.

2. A braking system as defined in claim 1, further comprising a braking force limiting device interposed between said actuating means and said main braking unit for limiting the force which can be furnished to said actuating means in response to operation of said main braking unit to a value less than required to effect an engagement between said second component and said driven component by way of said displacing means.

3. An overrunning braking system for a towed vehicle which is coupled to a towing vehicle, comprising main and auxiliary braking units mounted on the towed vehicle; at least one wheel brake mounted on the towed vehicle and comprising a driven component rotatable in forward and rearward directions and a plurality of braking components movable into and from frictional engagement with said driven component; and common braking force transmitting means provided between said units and said brake to effect a movement of at least one braking component into engagement with said driven component in response to operation of either one of said units, said braking components including first and second components which respectively act as primary components in response to operation of one of said units while said driven component respectively rotates in forward and rearward directions, said wheel brake further including actuating means receiving motion from said force transmitting means and arranged to urge said first component into engagement with said driven component in response to operation of either one of said units, and displacing means interposed between said actuating means and said second component to effect an engagement between said second component and said driven component only in response to operation of said auxiliary braking unit, said first braking component being arranged to furnish a reaction force in response to movement of said actuating means and to transmit such force to said second braking component by way of said actuating means and against the opposition of said displacing means.

4. A braking system as defined in claim 1, wherein said displacing means comprises at least one prestressed spring.

5. A braking system as defined in claim 4, wherein the resistance of said prestressed spring to deformation is less than the force necessary to move said second braking component into engagement with said driven component.

6. A braking system as defined in claim 1, further comprising a braking force limiting device interposed between said main braking unit and said force transmitting means.

7. A braking system as defined in claim 1, each of the wheel brakes having a discrete displacing means for the respective second braking components.

8. A overrunning braking system for a towed vehicle which is coupled to a towing vehicle, comprising main and auxiliary braking units mounted on the towed vehicle; at least one wheel brake mounted on the towed vehicle and comprising a driven component rotatable in forward and rearward directions and a plurality of braking components movable into and from frictional engagement with said driven component; and common braking force transmitting means provided between said units and said brake to effect a movement of at least one braking component into engagement with said driven component in response to operation of either one of said units, said braking components including first and second components which respectively act as primary components in response to operation of one of said units while said driven component respectively rotates in forward and rearward directions, said wheel brake further including actuating means receiving motion from said force transmitting means and arranged to urge said first component into engagement with said driven component in response to operation of either one of said units, and displacing means interposed between said actuating means and said second component to effect an engagement between said second component and said driven component only in response to operation of said auxiliary braking unit, said displacing means being deformable and being normally separated from said second braking component by a predetermined clearance which is reduced to zero on initial deformation of said displacing means in response to operation of said auxiliary braking unit or said main braking unit, said second component being arranged to engage said driven component in response to additional deformation of said displacing means beyond said initial deformation.

9. A braking system as defined in claim 8, wherein said main braking unit includes an input element movable from a first position to a second position in response to operation of said main braking unit to thereby move said actuating means by way of said force transmitting means and to effect at least some deformation of said displacing means less than said initial deformation so that at least some of said clearance remains in the second position of said input element.

10. A braking system as defined in claim 1, further comprising stop means interposed between said displacing means and said second braking component, said second braking component being arranged to abut and bear against said stop means in response to operation of one of said braking units while said driven component rotates in said forward direction.

11. A braking system as defined in claim 1, wherein said displacing means comprises at least one spring and means for subjecting said spring to a predetermined stress, said spring having a characteristic curve which degresses when said predetermined stress is exceeded.

12. A braking system as defined in claim 1, wherein said displacing means comprises at least one spring and means for subjecting said spring to a predetermined stress, said spring having a characteristic curve which regresses when said predetermined stress is exceeded.

13. A braking system as defined in claim 1, wherein said displacing means comprises at least one package of prestressed dished springs having a degressive characteristic curve.

14. A braking system as defined in claim 1, wherein said displacing means comprises at least one spring and means including at least one pivotable member for subjecting said spring to a predetermined initial stress, the assembly consisting of said spring and said pivotable member in relation to said actuating means having a characteristic curve which is regressive in the region beyond said predetermined stress.

15. A braking system as defined in claim 1, wherein said first braking component is arranged to engage said driven component with a first force in response to operation of one of said units while said driven component rotates in said forward direction, said second braking component being arranged to engage said driven component with a greater second force in response to operation of said auxiliary unit while said driven component rotates in said rearward direction.

16. A braking system as defined in claim 1, wherein said wheel brake further comprises power reducing means interposed between said first and second components to move said second component against said driven component in response to movement of said first component against said driven component on operation of one of said units while said driven component rotates in said forward direction.

17. A braking system as defined in claim 1, wherein said displacing means comprises at least one prestressed spring, said wheel brake further comprising at least one normally unstressed spring interposed between said actuating means and said displacing means.

18. A braking system as defined in claim 1, wherein said driven component is a brake drum and said braking components are brake shoes.

* * * * *

UNITED STATES PATENT OFFICE
CERTIFICATE OF CORRECTION

Patent No. 3,814,218      Dated June 4, 1974

Inventor(s) Herbert Merz

It is certified that error appears in the above-identified patent and that said Letters Patent are hereby corrected as shown below:

Column 14, line 29, "first" should read -- force --.

Signed and sealed this 22nd day of October 1974.

(SEAL)
Attest:

McCOY M. GIBSON JR.                C. MARSHALL DANN
Attesting Officer                   Commissioner of Patents